United States Patent
Gatti

[11] Patent Number: 5,897,231
[45] Date of Patent: Apr. 27, 1999

[54] SLIDE DUPLICATOR

[76] Inventor: John E. Gatti, 104 Treaty Elms La., Haddonfield, N.J. 08033

[21] Appl. No.: 08/027,656

[22] Filed: Mar. 8, 1993

[51] Int. Cl.[6] .................................................. G03B 17/24
[52] U.S. Cl. .......................... 396/332; 396/351; 396/544
[58] Field of Search .................................... 354/110, 117, 354/120, 122

[56] References Cited

U.S. PATENT DOCUMENTS

| 2,413,996 | 1/1947 | Ramsdell | 352/65 |
| 2,736,250 | 2/1956 | Papritz | 352/65 |
| 3,674,339 | 7/1972 | Sayanagi | 352/65 |
| 3,689,148 | 9/1972 | Black | 355/18 |
| 3,815,970 | 6/1974 | Murphy | 352/65 |
| 4,026,651 | 5/1977 | Vitou | 355/44 |
| 4,239,376 | 12/1980 | Wyller | 355/18 |
| 5,073,789 | 12/1991 | Mumpower | 354/122 |

Primary Examiner—David M. Gray
Attorney, Agent, or Firm—Norman E. Lehrer

[57] ABSTRACT

An attachment to a camera lens for creating a single slide transparency or photograph from two slide transparencies such that a before-and-after or combination picture can be formed on a single photograph or transparency comprising an enclosure formed from a plurality of opaque sides and one translucent side. An aperture is formed through one of the opaque sides and has a collar for connecting the slide duplicator to the camera lens. A slot located adjacent the single translucent side is used for engaging the slide transparencies that are to be photographed. Mirrors within the duplicator are arranged for reflecting and directing images formed from light rays passing through the translucent side and through the slides to the camera lens so that the camera can photograph the dual images onto a single transparency or photograph. First surface mirrors are used in lieu of regular mirrors for clearly and distinctly reflecting and directing the images.

5 Claims, 2 Drawing Sheets

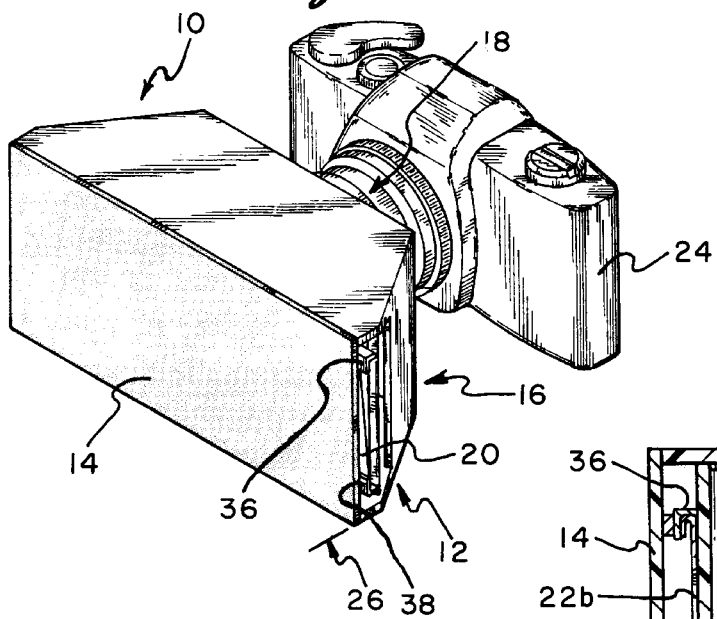
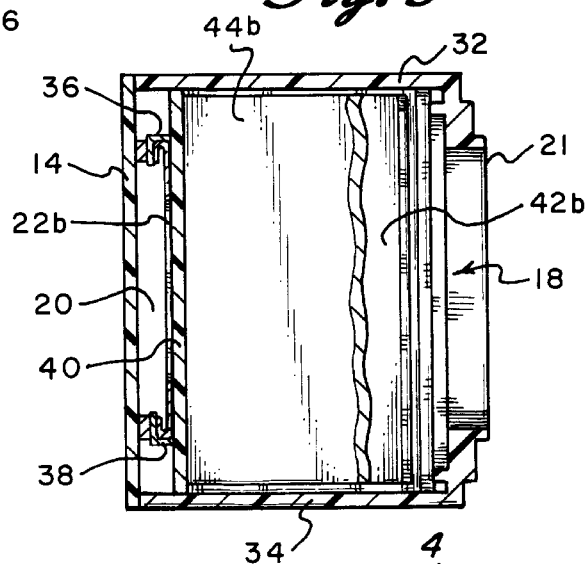
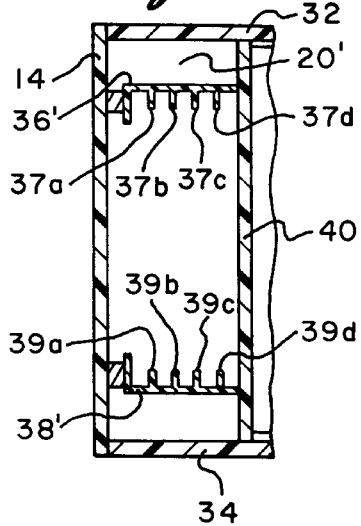
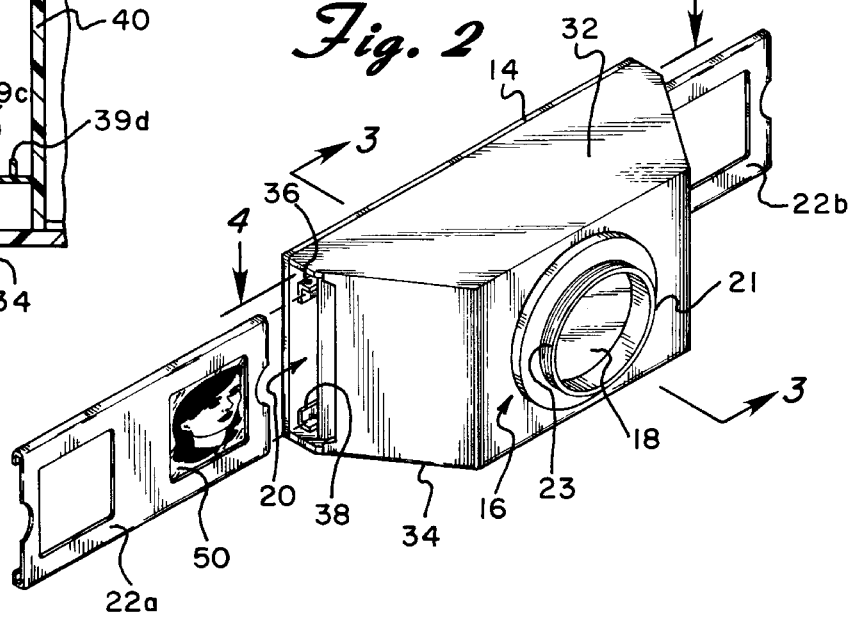

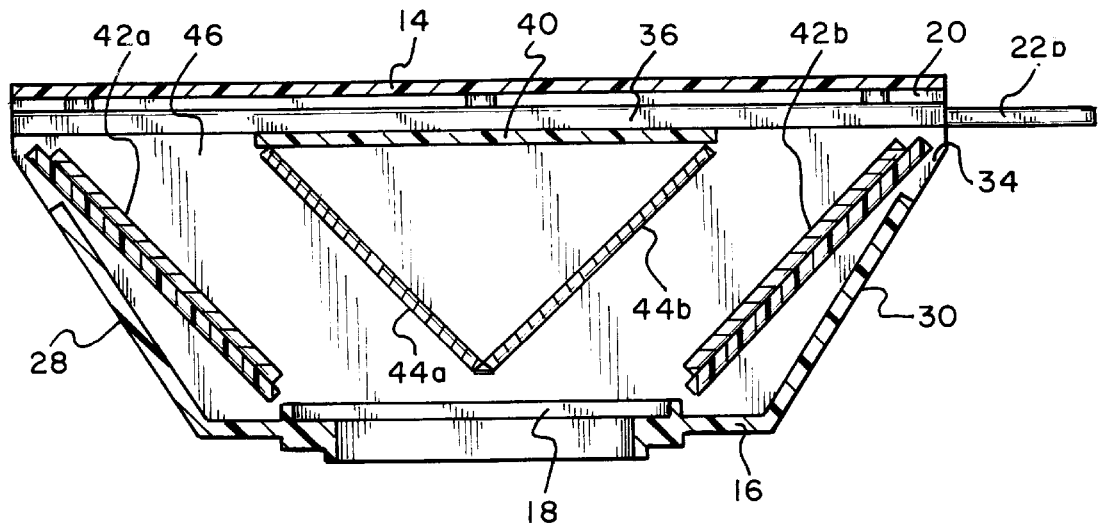
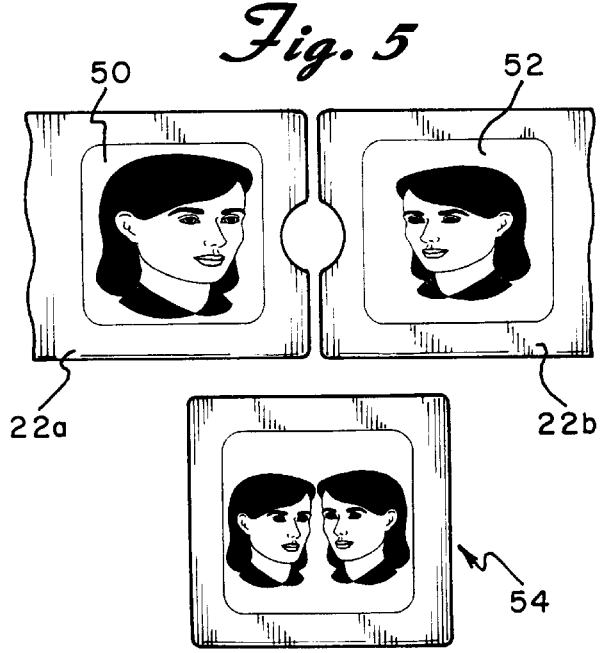
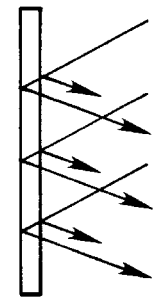

SLIDE DUPLICATOR

BACKGROUND OF THE INVENTION

This invention relates to photography and, more particularly, to creating combined photographic or slide transparency copies of two existing slide transparencies.

From an artistic perspective and a practical perspective, it is often desirable to combine incongruous photographs or slide transparencies onto a single slide or photograph. Often such combinations are created to form a collage comprised of images from a variety of visual experiences. From a practical standpoint, it is also desirable to show before-and-after pictures on the same photograph or transparency or, similarly a comparison-type photograph or transparency showing two or more distinct places, people, or things for numerous reasons.

Cameras and lenses for cameras have been designed and some have been patented which allow the user to create a photographic collage on a single photograph or slide transparency. Most of the collage-creating cameras or lenses, however, only allow for the making of the collage at the particular time a photograph is being taken. Accordingly, these inventions make it difficult to take a before-and-after picture wherein the time period between the before-and-after states is relatively long. The present cameras or lenses generally allow the operator to take pictures on separate parts of the film by using a masking device to block out portions of the film while other portions of the film are being exposed. Accordingly, a picture can be taken of separate images and combined onto one picture using the masking process but the finished product is limited to images available in and around the same time period and geographical location.

For example, U.S. Pat. No. 4,012,748 to Lemanski discloses a camera attachment which allows the photographer to develop on a single print, different and previously separate images. As disclosed, the invention is capable of creating split image transparency slides for projection onto a screen. However, as discussed, the photographer is limited by his present geographical location and is limited to those images currently available to him. Accordingly, the invention is not useful for creating a before-and-after picture or slide having a large time period between the before-and-after states nor is it capable of taking pictures of slides and exposing them onto a single slide or photograph.

Similar to Lemanski, U.S. Pat. No. 4,896,176 to Barrett discloses a camera for making collage photographs. The camera is of the instant variety which incorporates a template to be used with the instant film pack. Film transparencies that bear prephotographed images can be placed on certain areas of the template while the remaining uncovered portion of the template is the area in which a new photograph can be exposed upon taking a picture with the camera. As a result, a collage photograph or even a before-and-after picture can be formed even when large time periods have passed between the capturing of the images to be combined on film. However, the camera can only be used with instant photography and cannot be used to make slide transparencies.

U.S. Pat. No. 3,697,175 to Sullivan discloses a camera for copying a photographic transparency and reproducing an enlarged refection print. A transparency is placed in a holder attached to an attachment that is placed on the camera. The photograph is accomplished in part by directing light through the rear surface of the transparency which is positioned on the attachment. However, the device disclosed is used for making instant photographs and does not have the ability to photograph several transparencies onto one new exposure. Accordingly, a before-and-after or combination photograph or transparency cannot be produced by using this camera attachment.

SUMMARY OF THE INVENTION

The invention of the present application is a photographic apparatus used for making before-and-after or combination pictures on a slide transparency or photograph. The apparatus is used for taking a photograph or transparency of two distinct transparencies placed into the apparatus. Accordingly, two distinct images from different time periods and/or geographical areas having been separately captured and developed can be placed on the same slide or photograph.

In accordance with the invention, the apparatus comprises an enclosure formed from a plurality of opaque sides and one translucent side. The enclosure has an aperture therethrough for connecting the apparatus to the camera lens and aligning the apparatus with the lens. The translucent side is located substantially parallel to the aperture side but spaced from the camera lens and aperture. The enclosure also has a vertically extending slot located adjacent to the translucent side for engaging the slide transparencies.

Mirrors are attached to and arranged within the enclosure for reflecting and directing images formed from light rays passing through the translucent side and through the slide transparencies located within the enclosure adjacent the translucent side. The mirrors reflect the images through the enclosure into direct alignment with the camera lens. The mirrors function to direct the two separate images of the slide transparencies to the camera lens such that the camera lens can photograph both images onto one separate slide. In order to clearly and distinctly reflect the images from the slides being photographed, first surface mirrors are used which alleviate the problem of multiple reflections.

BRIEF DESCRIPTION OF THE DRAWINGS

For the purpose of illustrating the invention, there are shown in the accompanying drawings forms which are presently preferred; it being understood that the invention is not intended to be limited to the precise arrangements and instrumentalities shown.

FIG. 1 is a perspective view of the slide duplicator as installed on a typical camera;

FIG. 2 is a perspective view of the slide duplicator and slide holders showing the manner in which the holders are secured within the slide duplicator;

FIG. 3 is a side cross-sectional view of the slide duplicator;

FIG. 3a is a view similar to FIG. 3 but showing a modified form of the invention;

FIG. 4 is a top cross-sectional view of the slide duplicator showing the arrangement of the mirrors;

FIG. 5 is an example of slides which may be photographed by the slide duplicator and an example of the slide resulting from using the slide duplicator and photographing the slides;

FIG. 6 shows the manner in which light reflects off first surface mirrors, and

FIG. 6a shows the manner in which light reflects off a normal or rear surface mirror.

DETAILED DESCRIPTION OF THE PREFERRED EMBODIMENT

Referring now to the drawings in detail wherein like reference numerals have been used throughout the various figures to designate like elements, there is shown in FIG. 1 a perspective view of the slide duplicator constructed in accordance with the principals of the present invention and installed upon a camera and designated generally as 10.

The slide duplicator 10 is comprised of an enclosure 12 formed from numerous opaque sides and a translucent side 14. The slide duplicator is further comprised of an aperture side 16 running parallel to the translucent side 14 having an aperture 18 therethrough, and slot 20 adjacent the translucent side 14 having means for engaging slide holders 22a and 22b.

Referring now to FIG. 2, the enclosure 12 forming the bulk of the slide duplicator 10 is essentially a polygon having six sides, it being understood that different configurations of the enclosure can be used. The sides 14 and 16 are substantially parallel. The translucent side 14 is comprised of a translucent material, preferably plastic or the like, such that light is capable of filtering through side 14 when the camera 24 and slide duplicator 10 are directed at a light source. The side 14 must be sufficiently opaque, however, to block out enough light to avoid over illumination of the images from the slides placed within the slide duplicator. The side 14 extends the entire distal end 26 of the slide duplicator and is substantially rectangular in shape. Extending parallel to the side 14, is the aperture side 16 having the aperture 18 therethrough. The aperture 18 is surrounded by a mounting collar 21 which has an external thread 23 thereon for securing the slide duplicator 10 to the camera 24. The collar 21 may be detachable for replacing it with a different size collar for different size cameras or a different attachment means. The aperture 18 is of sufficient size to allow full range use of the camera lens.

Side walls 26 and 28 extend from the aperture side 16 toward the translucent side 14. However, the sides do not extend all the way back to the translucent side 14. As such, a vertical slot 20 is left in the slide duplicator 10 adjacent the translucent side 14. The slot 20 extends the full width of the slide duplicator such that the slot is accessible from either side of the slide duplicator. The top wall 32 and bottom wall 34 also extend from the aperture wall 16 but unlike the side walls 26 and 28, the top and bottom walls 32 and 34, respectively, extend all the way to the translucent side 14. As such, there is no gap or slot through the top 32 or the bottom 34 of the slide duplicator.

The slot 20 is used to engage and hold the slide holders 22a and 22b within the slide duplicator. Within the slot, there are mounted rails 36 and 38. The rails are substantially L-shaped and are attached to the translucent wall 14. Rail 36 is attached to the wall adjacent its top end and rail 38 is attached near the bottom end of the wall 14. The rails are attached such that the interior of the L is facing the aperture side 16. The lower or shorter portion of the L for each rail acts as the extreme top and bottom engaging positions of the slot 20 in which the slide holders 22a and 22b may be placed. The rails are positioned a distance apart from each other such that the slide holders 22a and 22b fit securely yet slidingly therein.

In a second embodiment, as shown in FIG. 3a, the upper or longer portion of the L for each rail acts as the extreme top and bottom engaging positions of the slot 20'. The longer portions of the rails have a plurality of projections, preferably four, 37a–37d and 39a–39d, for rails 36' and 38', respectively, extending inwardly toward each other as shown in FIG. 3a. The projections are evenly spaced apart wherein each space therebetween is large enough to accommodate a slide holder. As a result, the slide holders can be moved toward or away from the aperture 18 and camera lens. This feature allows the slide duplicator user to individually adjust the size of each of the two images reflected to the camera. If, for example, the slides which are to be combined exhibit images of relatively different size, and the user wishes to project the images such that they are equivalent in size, the larger image can be moved further away, using the projections and spaces 37a–d and 39a–d, from the camera lens and mirror arrangement so as to decrease the size of the image reflected. By moving a slide holder having a slide therein further away from the aperture relative to the other slide holder, different size images can be combined and projected as substantially equivalent size images.

Obviously, the foregoing is only one example of a structure which may accomplish the task of individually changing the positions of the slides relative to the camera for adjusting image size. Other and possibly more accurate methods of accomplishing this end are available such as by using friction surfaces for gripping the slide holders in different positions or slidably adjustable rails for moving the holders independently of each other relative to the camera.

The interior of the slide duplicator is comprised of an inner wall 40, as shown in FIG. 4, a first pair of mirrors 42a and 42b and a second pair of mirrors 44a and 44b. The inner wall 40 is located adjacent the rails 36 and 38 and opposite the translucent wall 14. The inner wall extends vertically and is located in the center of the slide duplicator but does not extend for the full width of the slide duplicator. The function of the inner wall 40 is to assist in securing the second pair of mirrors 44a and 44b. The first pair of mirrors 42a and 42b are located adjacent but slightly angled to the side walls 28 and 30, respectively.

Referring to FIG. 4, the first pair of mirrors 42a and 42b are positioned at approximately 45° to the aperture wall 16 and extend approximately from the perimeter of the aperture 18 to the opening of the slot 20 on both sides of the slide duplicator 10. Second mirrors 44a and 44b are located in the center interior of the slide duplicator 10. Each mirror 44a and 44b extends from approximately the vertical center line of the aperture 18 and 45° to the aperture wall 16 toward the translucent side 14. The second pair of mirrors 44a and 44b are positioned such that they are parallel to the first pair of mirrors 42a and 42b, respectively. The mirrors 44a and 44b extend back to the inner wall 40 such that there is a space 46 between the edges of first mirror 42a and second mirror 44a and a space 48 between the edges of first mirror 42b and second mirror 44b.

The spaces 46 and 48 are of sufficient size to allow slides to be placed in the slide holders 22a and 22b and placed onto the rails 36 and 38 from each side of the slide duplicator such that the entire image on each slide fits within each space. Appropriate stops can be located within the slot 20 and on the rails 36 and 38 such that the slide holders 22a and 22b will stop at the proper position upon insertion to align the slides with the openings 46 and 48.

The mirrors 42a, 42b, 44a and 44b are aligned such that as the light passes through the slides 50 and 52 (see FIG. 5), the image is reflected off the first pair of mirrors 42a and 42b onto the second pair of mirrors 44a and 44b and toward the camera lens for alignment therewith and the taking of the photograph. Because of the angular relationship of the first and second mirrors with the mounted slide transparencies 50 and 52, the images from the slide transparencies are reduced in size and projected at a size capable of being photographed by a camera lens and being placed on a single slide transparency 54.

As shown in FIG. 6, first surface mirrors are used with the slide duplicator to guarantee the reflection of only one image in contrast to the possibility of multiple reflection with a typical mirror arrangement as shown in 6a. That is, when using a normal or rear surface mirror, some light is also reflected off of the front glass surface thereby creating fuzzy images. By utilizing only first or front surface mirrors, the reflected image is maintained in a clear and distinctive manner.

The slide duplicator is used by first installing it upon the camera as shown in FIG. 1 via the mounting collar 21 or other attachment means that might be included with the slide duplicator 10. As shown in FIG. 5, the two slides that the photographer desires to be placed on a single slide for creating a before-and-after picture or a combined photograph, are selected and placed within the slide holders 22a and 22b. After placement of the slides, the slide holders 22a and 22b are placed in opposite ends of the slot 20 for engagement with rails 36 and 38. It is important to align the slides on the slide holders with the spaces 46 and 48. This can be accomplished by barriers or stops placed on the rails 36 and 38 so that the slide holders can only be inserted to the proper position in alignment with the camera lens. Alternatively, the slide holders and slides can be properly positioned while the photographer is looking through the lens.

When the slide holders 22a and 22b and slides 50 and 52 are properly aligned, the images are reflected off the first pair of mirrors 42a and 42b and onto the second pair of mirrors 44a and 44b. Due to the angular relationship between the first pair of mirrors 42a and 42b and the slides 50 and 52, respectively, and the angular relationship between the first pair of mirrors 42a and 42b and the second pair of mirrors 44a and 44b, respectively, the images from the slides 50 and 52 are reflected to and into alignment with the camera lens. However, the images are reflected and converted into smaller versions of the same images so that the camera lens can photograph them onto a single slide transparency. As pointed out above, it may be desirable to move one of the slides toward or away from the lens to enlarge or reduce the image thereof. After proper alignment, the photographer simply takes the picture and the before-and-after or combination photograph or slide is created.

The present invention may be embodied in other specific forms without departing from the spirit or essential attributes thereof and accordingly reference should be made to the appended claims rather than to the foregoing specification as indicating the scope of the invention.

What is claimed is:

1. A photographic apparatus for attachment to a camera lens for simultaneously creating a single slide transparency or photograph from a plurality of slide transparencies having distinct images exposed thereon, comprising:

an enclosure formed from a plurality of opaque sides and at least one translucent side, said enclosure having an aperture therethrough at a proximal side and having means for connecting the same to a camera and aligning said aperture with the camera lens, said enclosure further having means located therein for holding said slide transparencies, said at least one translucent side comprising a vertically extending wall formed from a translucent material and positioned opposite and substantially parallel to said proximal side; and mirror means arranged within said enclosure for reflecting and directing images formed from light rays passing through said at least one translucent side and separately through each of said plurality of slide transparencies to and into alignment with said camera lens, said mirror means being comprised of first mirror means for reflecting and directing an image from a first of said slide transparencies to said camera lens, and second mirror means for reflecting and directing an image from a second of said slide transparencies to said camera lens adjacent said first image, said first mirror means being comprised of first and second mirrors and said second mirror means being comprised of third and fourth mirrors, said first and third mirrors being positioned on opposite sides of said aperture and extending toward said translucent side at an angle to said aperture, said second and fourth mirrors being positioned in reflective alignment with said aperture and extending toward said translucent side at an angle to said aperture and parallel to said first and third mirrors, said second and fourth mirrors also being in reflective alignment with said first and third mirrors, said first, second, third and fourth mirrors having distal edges located toward said translucent side, said distal edges of said mirrors defining spaces on each side of said enclosure for positioning said transparencies therein.

2. The invention according to claim 1 wherein said mirror means comprises first surface mirrors.

3. The invention according to claim 1 wherein said holding means comprises a vertically extending slot formed through said enclosures.

4. A photographic apparatus for attachment to a camera lens for simultaneously creating a single slide transparency or photograph from a plurality of slide transparencies having distinct images exposed thereon, comprising:

an enclosure formed from a plurality of opaque sides and at least one translucent side, said enclosure having an aperture therethrough at a proximal side and having means for connecting the same to a camera and aligning said aperture with the camera lens, said enclosure further having means located therein for holding said slide transparencies; and means within said enclosure for directing images formed from light rays passing through said at least one translucent side and separately through each of said plurality of slide transparencies to and into alignment with said camera lens, wherein said holding means includes adjustment means for individually moving a slide transparency closer to or farther away from the camera lens for adjusting the size of the images directed to the camera lens.

5. The invention according to claim 4 wherein said adjustment means comprises L shaped rails defining an upper and lower engaging surface for engaging said slides transparencies, said upper and lower surfaces having projections therefrom defining a plurality of tracks for holding said slide transparencies at different distances from said camera lens.

* * * * *